United States Patent
Asahara

(10) Patent No.: US 7,720,926 B2
(45) Date of Patent: May 18, 2010

(54) INFORMATION PROCESSING SYSTEM, AN INFORMATION APPARATUS, MACRO EXECUTING METHOD, AND STORAGE MEDIUM

(75) Inventor: Hideo Asahara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 519 days.

(21) Appl. No.: 11/677,885

(22) Filed: Feb. 22, 2007

(65) Prior Publication Data
US 2007/0220475 A1 Sep. 20, 2007

(30) Foreign Application Priority Data

Feb. 23, 2006 (JP) .............................. 2006-046851
Feb. 7, 2007 (JP) .............................. 2007-028277

(51) Int. Cl.
*G06F 15/16* (2006.01)
(52) U.S. Cl. .................... 709/207; 709/204; 709/205; 709/206
(58) Field of Classification Search ................. 709/223, 709/225
See application file for complete search history.

(56) References Cited

U.S. PATENT DOCUMENTS

| | | | |
|---|---|---|---|
| 6,813,707 B1* | 11/2004 | Batcher ...................... | 712/242 |
| 6,816,270 B1* | 11/2004 | Cooper et al. .............. | 358/1.13 |
| 7,240,110 B2* | 7/2007 | Haitsuka et al. ............ | 709/224 |
| 7,302,558 B2* | 11/2007 | Campbell et al. ............. | 713/1 |
| 2002/0099818 A1* | 7/2002 | Russell et al. ............... | 709/224 |
| 2003/0142332 A1* | 7/2003 | Endoh et al. ............... | 358/1.11 |
| 2005/0021587 A1* | 1/2005 | Takano et al. ............... | 709/200 |
| 2005/0021744 A1* | 1/2005 | Haitsuka et al. ............. | 709/224 |
| 2005/0122357 A1* | 6/2005 | Sakuraba et al. ............. | 347/14 |
| 2005/0179921 A1* | 8/2005 | Brossman et al. .......... | 358/1.13 |
| 2006/0044587 A1* | 3/2006 | Yoshida ..................... | 358/1.13 |

FOREIGN PATENT DOCUMENTS

| | | |
|---|---|---|
| JP | 05-246111 A | 9/1993 |
| JP | 08-329338 A | 12/1996 |

\* cited by examiner

*Primary Examiner*—Quang N. Nguyen
*Assistant Examiner*—Razu A Miah
(74) *Attorney, Agent, or Firm*—Rossi, Kimms & McDowell LLP

(57) ABSTRACT

An information processing system in which a warning is generated in advance when a macro including unsupported functions is executed, realizing improved usability for users. A multi-function apparatus and a server holding at least one macro indicative of a procedure for executing at least one function are connected to each other via a network. A macro referring section provided in the multi-function apparatus acquires a macro held by the second information apparatus. An unsupported function checking section provided in the server detects functions that cannot be realized by the first information apparatus from among functions included in the macro. A warning information providing section provided in the second information apparatus creates warning information relating to the detected unsupported functions and transmits the warning information to the multi-function apparatus. A warning section provided in the multi-function apparatus notifies a user of the transmitted warning information.

15 Claims, 14 Drawing Sheets

FIG. 11

```xml
<?xml version=" 1.0" encoding=" UTF-8" ?>
<MACRO>
   <SCAN>
     <DENSITY>+1</DENSITY>
     <DOUBLE-SIDED>true</DOUBLE-SIDED>
     <MAGNIFICATION>100% MAGNIFICATION</MAGNIFICATION>
   </SCAN>
   <PRINT>
     <NUMBER OF COPIES>5</NUMBER OF COPIES>
     <BOOKBINDING>true</BOOKBINDING>
   </PRINT>
   <SEND>
     <ELECTRONIC MAIL>a@com</ELECTRONIC MAIL>
     <FILE FORMAT>ENCRYPTED PDF</FILE FORMAT>
   </SEND>
</MACRO>
```

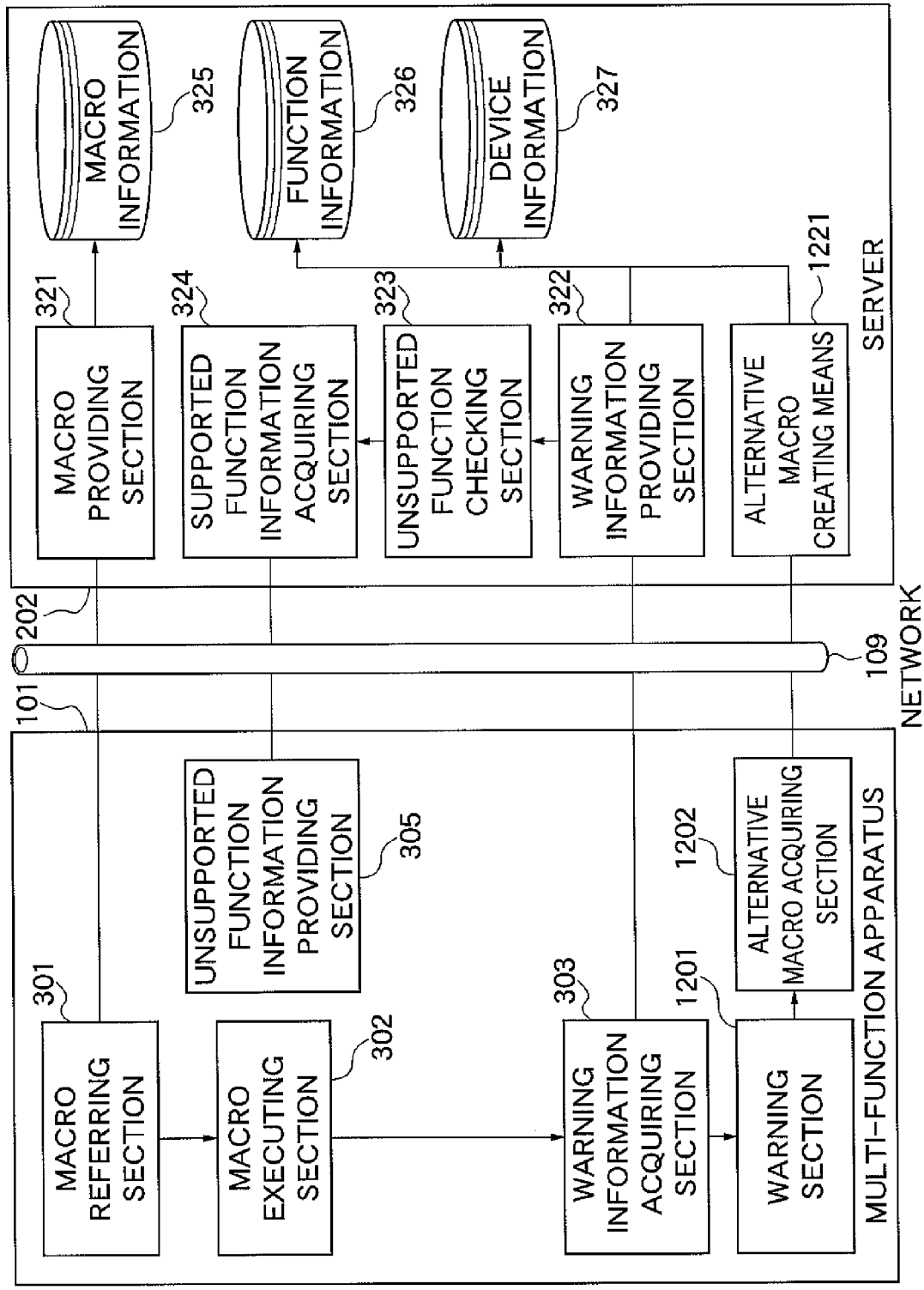

FIG. 14

```
<?xml version=" 1.0" encoding=" UTF-8" ?>
<MACRO>
   <SCAN>
     <DENSITY>+1</DENSITY>
     <DOUBLE-SIDED>true</DOUBLE-SIDED>
     <MAGNIFICATION>100% MAGNIFICATION</MAGNIFICATION>
   </SCAN>
   <PRINT>
     <NUMBER OF COPIES>5</NUMBER OF COPIES>
     <DOUBLE-SIDED>true</DOUBLE-SIDED>
     <IMPOSITION>2in1</IMPOSITION>
   </PRINT>
   <SEND>
     <ELECTRONIC MAIL>a@com</ELECTRONIC MAIL>
   </SEND>
</MACRO>
```

INFORMATION PROCESSING SYSTEM, AN INFORMATION APPARATUS, MACRO EXECUTING METHOD, AND STORAGE MEDIUM

BACKGROUND OF THE INVENTION

1. Field of the Invention

The present invention relates to an information processing system, an information apparatus, a macro executing method, and a storage medium. In particular, the present invention relates to an information processing system in which a first information apparatus and a second information apparatus holding at least one macro indicative of a procedure for executing a plurality of functions are connected to each other via a network, an information apparatus constituting the information processing system, a macro executing method applied to the information processing system and the information apparatus, and a storage medium storing a program for causing a computer to execute the macro executing method.

2. Description of the Related Art

Recently, a multi-function printer (multi-function apparatus, hereinafter referred to as "MFP") has a printer function, a facsimile transmitting and receiving function, an electronic mail transmitting and receiving function, and so on in addition to a copy function so as to improve the working efficiency.

With the increases in the functions of the MFPs, items that have to be set by users via operating sections of the MFPs have increased. To cope with this, a macro function of recording operations performed by a user and allocating the recorded contents to one operation key has been proposed so as to improve the operability.

Examples of MFPs having the macro function include a first MFP proposed in Japanese Laid-Open Patent Publication (Kokai) No. H05-246111 and a second MFP proposed in Japanese Laid-Open Patent Publication (Kokai) No. H08-329338. In the first MFP, the types of operation keys that have been depressed continuously and the order in which they have been depressed are registered as a macro (processing procedure) using key codes generated in response to depression of operation keys, and when a call key for this macro is depressed, this macro is executed. In the second MFP, while the MFP is being caused to actually carry out an executing process, this executing process is registered as a macro so as to prevent a macro registration error.

There are cases where macros as mentioned above are distributed to a plurality of MFPs via a network or external storage devices. However, because of differences in optional arrangements and security-related circumstances of the MFPs, executable functions vary depending on the MFPs in many cases. For this reason, there is the problem that a macro is distributed to an MFP that cannot execute the macro and the problem that a macro of which execution is instructed from one macro to the other MFP cannot be executed by the other MFP.

In consideration of such problems, there has conventionally been adopted an arrangement in which, when an MFP executes a macro including functions unsupported by the MFP, the MFP ignores the functions. For example, in the case where an MFP that does not support a character recognizing function executes a macro including the character recognizing function as well as an electronic mail transmitting function, the MFP executes only electronic mail transmission without carrying out character recognition.

Each of the above-described conventional MFPs is arranged such that, in executing a macro including functions unsupported by the MFP, the MFP ignores the unsupported functions. However, there has been the problem that users of the conventional MFPs are not notified of the ignorance of such unsupported functions. Specifically, an MFP that is trying to execute a macro held by another MFP has no information relating to functions included in the macro, and hence the MFP cannot provide a user in advance with information relating to functions to be ignored. Also, the MFP cannot reflect a user's intent as to whether to permit the ignorance of unsupported functions.

SUMMARY OF THE INVENTION

The present invention has been made in consideration of the above described problems and has as its object to provide an information processing system, an information apparatus, and a macro executing method that generate a warning in advance when a macro including unsupported functions is executed, realizing the improved usability for users, as well as a storage medium storing a program for causing a computer to execute the macro executing method.

To attain the above object, in a first aspect of the present invention, there is provided an information processing system in which a first information apparatus and a second information apparatus holding at least one macro indicative of a procedure for executing at least one function are connected to each other via a network, comprising: a macro acquiring unit that is provided in the first information apparatus and that acquires a macro held by the second information apparatus; an unsupported function detecting unit that is provided in the second information apparatus and that detects functions that cannot be realized by the first information apparatus from among functions included in the macro; a warning information transmitting unit that is provided in the second information apparatus and that creates warning information relating to the functions detected by the unsupported function detecting unit and transmits the warning information to the first information apparatus; and a notifying unit that is provided in the first information apparatus and that notifies a user of the warning information transmitted by the warning information transmitting unit.

Preferably, the warning information transmitting unit adds information relating to an information apparatus capable of realizing the functions detected by the unsupported function detecting unit from among a plurality of information apparatuses connected to the network and transmits the information to the first information apparatus.

Preferably, the first information apparatus further comprises a function notifying unit that notifies the second information apparatus of functions that can be realized by the first information apparatus, and wherein the unsupported function detecting unit that regards the functions notified from the function notifying unit as functions that can be realized by the first information apparatus.

Preferably, the warning information includes information that prompts the user to give an instruction regarding execution of the macro, and wherein the first information apparatus further comprises macro execution control unit that provides control to execute the macro or cancel execution of the macro in accordance with an intent of the user who has responded to the warning information.

Preferably, the information processing system further comprises: an alternative macro creating unit that is provided in the second information apparatus, for creating an alternative macro by replacing the functions detected by the unsupported function detecting means with alternative functions, the warning information transmitting unit further transmits information on the alternative macro to the first information apparatus, and the notifying unit notifies the user of information on the alternative macro transmitted from the warning information transmitting unit.

Preferably, the alternative macro creating unit is capable of creating a plurality of alternative macros, and the notifying unit notifies the user of information on the plurality of alternative macros and a message that prompts the user to select an alternative macro.

In a second aspect of the present invention, there is provided an information apparatus that holds at least one macro indicative of a procedure for executing at least one function and is connected to another information apparatus via a network, comprising: a macro information providing unit that provides the other information apparatus with a macro designated by the other information apparatus; an unsupported function detecting unit that detects functions that cannot be realized by the other information apparatus from among functions included in the designated macro; and a warning information transmitting unit that creates warning information on the functions detected by the unsupported function detecting unit and transmits the warning information to the other information apparatus.

In a third aspect of the present invention, there is provided an information processing system in which a first information apparatus and a second information apparatus holding at least one macro indicative of a procedure for executing at least one function are connected to each other via a network, comprising: a macro acquiring unit that is provided in the first information apparatus and that acquires a macro held by the second information apparatus; an unsupported function detecting unit that is provided in the first information apparatus and that detects functions that cannot be realized by the first information apparatus from among functions included in the macro; a warning information transmitting unit that is provided in the second information apparatus and that creates warning information relating to the functions detected by the unsupported function detecting unit and transmits the warning information to the first information apparatus; and a notifying unit provided in the first information apparatus and that notifies a user of the warning information transmitted by the warning information transmitting means.

Preferably, the notifying unit adds information relating to an information apparatus capable of realizing the functions detected by the unsupported function detecting unit from among a plurality of information apparatuses connected to the network and notifies the information to the user.

Preferably, the warning information includes information that prompts the user to give an instruction regarding execution of the macro, and the first information apparatus further comprises macro execution control unit that provides control to execute the macro or cancel execution of the macro in accordance with an intent of the user who has responded to the warning information.

In a fourth aspect of the present invention, there is provided an information apparatus that is connected to another information apparatus holding at least one macro indicative of a procedure for executing at least one function via a network, comprising: a macro acquiring that acquires a macro held by the other information apparatus; an unsupported function detecting unit that detects functions that cannot be realized by the information apparatus from among functions included in the macro; and a notifying unit that receives warning information relating to the functions, detected in the unsupported function detecting means, from the other information apparatus and notifies a user of the warning information.

In a fifth aspect of the present invention, there is provided a macro executing method applied to an information processing system in which a first information apparatus and a second information apparatus holding at least one macro indicative of a procedure for executing at least one function are connected to each other via a network, comprising: a macro acquiring step in which the first information apparatus acquires a macro held by the second information apparatus; an unsupported function detecting step in which the second information apparatus detects functions that cannot be realized by the first information apparatus from among functions included in the macro; a warning information transmitting step in which the second information apparatus creates warning information relating to the functions detected in the unsupported function detecting step and transmits the warning information to the first information apparatus; and a notifying step in which the first information apparatus notifies a user of the warning information transmitted in the warning information transmitting step.

In a sixth aspect of the present invention, there is provided a macro executing method applied to an information apparatus that holds at least one macro indicative of a procedure for executing at least one function and is connected to another information apparatus via a network, comprising: a macro providing step of providing the other information apparatus with a macro designated by the other information apparatus; an unsupported function detecting step of detecting functions that cannot be realized by the other information apparatus from among functions included in the designated macro; and a warning information transmitting step of creating warning information on the functions detected in the unsupported function detecting step and transmitting the warning information to the other information apparatus.

In a seventh aspect of the present invention, there is provided a macro executing method applied to an information processing system in which a first information apparatus and a second information apparatus holding at least one macro indicative of a procedure for executing at least one function are connected to each other via a network, comprising: a macro acquiring step in which the first information apparatus acquires a macro held by the second information apparatus; an unsupported function detecting step in which the first information apparatus detects functions that cannot be realized by the first information apparatus from among functions included in the macro; a warning information transmitting step in which the second information apparatus creates warning information relating to the functions detected in the unsupported function detecting step and transmits the warning information to the first information apparatus; and a notifying step in which the first information apparatus notifies a user of the warning information transmitted in the warning information transmitting step.

In an eighth aspect of the present invention, there is provided a macro executing method applied to an information apparatus that is connected to another information apparatus holding at least one macro indicative of a procedure for executing at least one function via a network, comprising: a macro acquiring step of acquiring a macro held by the other information apparatus; an unsupported function detecting step of detecting functions that cannot be realized by the information apparatus from among functions included in the macro; and a notifying step of receiving warning information relating to the functions, detected in the unsupported function detecting step, from the other information apparatus and notifying a user of the warning information.

In a ninth aspect of the present invention, there is provided a storage medium storing a program for causing an information apparatus to execute a macro executing method applied to the information apparatus that holds at least one macro indicative of a procedure for executing at least one macro indicative of a procedure of executing at least one function and connected to another information apparatus via a network, the method comprising: a macro providing step of providing the other information apparatus with a macro designated by the other information apparatus; an unsupported function detecting step of detecting functions that cannot be realized by the other information apparatus from among functions included in the designated macro; and a warning information transmitting step of creating warning information on the functions detected in the unsupported function detecting step and transmitting the warning information to the other information apparatus.

In a tenth aspect of the present invention, there is provided a storage medium storing a program for causing an information apparatus to execute a macro executing method applied to the information apparatus that is connected to another information apparatus holding at least one macro indicative of a procedure for executing at least one function via a network, comprising: a macro acquiring step of acquiring a macro held by the other information apparatus; an unsupported function detecting step of detecting functions that cannot be realized by the information apparatus from among functions included in the macro; and a notifying step of receiving warning information relating to the functions, detected in the unsupported function detecting step, from the other information apparatus and notifying a user of the warning information.

According to the arrangement of the present invention, in the information processing system in which the first information apparatus and the second information apparatus holding at least one macro indicative of a procedure for executing at plurality of functions are connected to each other via the network, the first information apparatus acquires macro information relating to a predetermined macro held by the second information apparatus. On the other hand, the second information apparatus detects functions that cannot be realized by the first information apparatus from among functions included in the predetermined macro, creates warning information relating to the detected functions, and transmits the warning information to the first information apparatus. The first information apparatus notifies the user of the transmitted warning information.

Also, according to the arrangement of the present invention, the first information apparatus acquires macro information relating to a predetermined macro held by the second information apparatus, and also detects functions that cannot be realized by the first information apparatus from among functions included in the predetermined macro. On the other hand, the second information apparatus creates warning information relating to the detected functions and transmits the warning information to the first information apparatus. The first information apparatus notifies the user of the transmitted warning information.

In this way, in the case where the first information apparatus executes a macro including unsupported functions, warning information is generated in advance. Based on the warning information, the user of the first information apparatus can give an instruction for executing the macro or aborting the execution of the macro in advance and obtain information about the information apparatus supporting all the functions included in the macro. Thus, the usability for users can be improved.

Other features and advantages of the prevent invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 11 is a macro described in XML;

FIG. 12 is a block diagram showing functions realized by a CPU of a multi-function apparatus executing predetermined software and functions realized by the CPU of a server executing predetermined software in an information processing system according to the third embodiment;

FIG. 14 is a view showing an example of an alternative macro created by an alternative macro creating section when the multi-function apparatus executes the macro illustrated in FIG. 11.

DETAILED DESCRIPTION OF THE PREFERRED EMBODIMENTS

Preferred embodiments of the present invention will be described in detail below with reference to the drawings.

Figure 1:
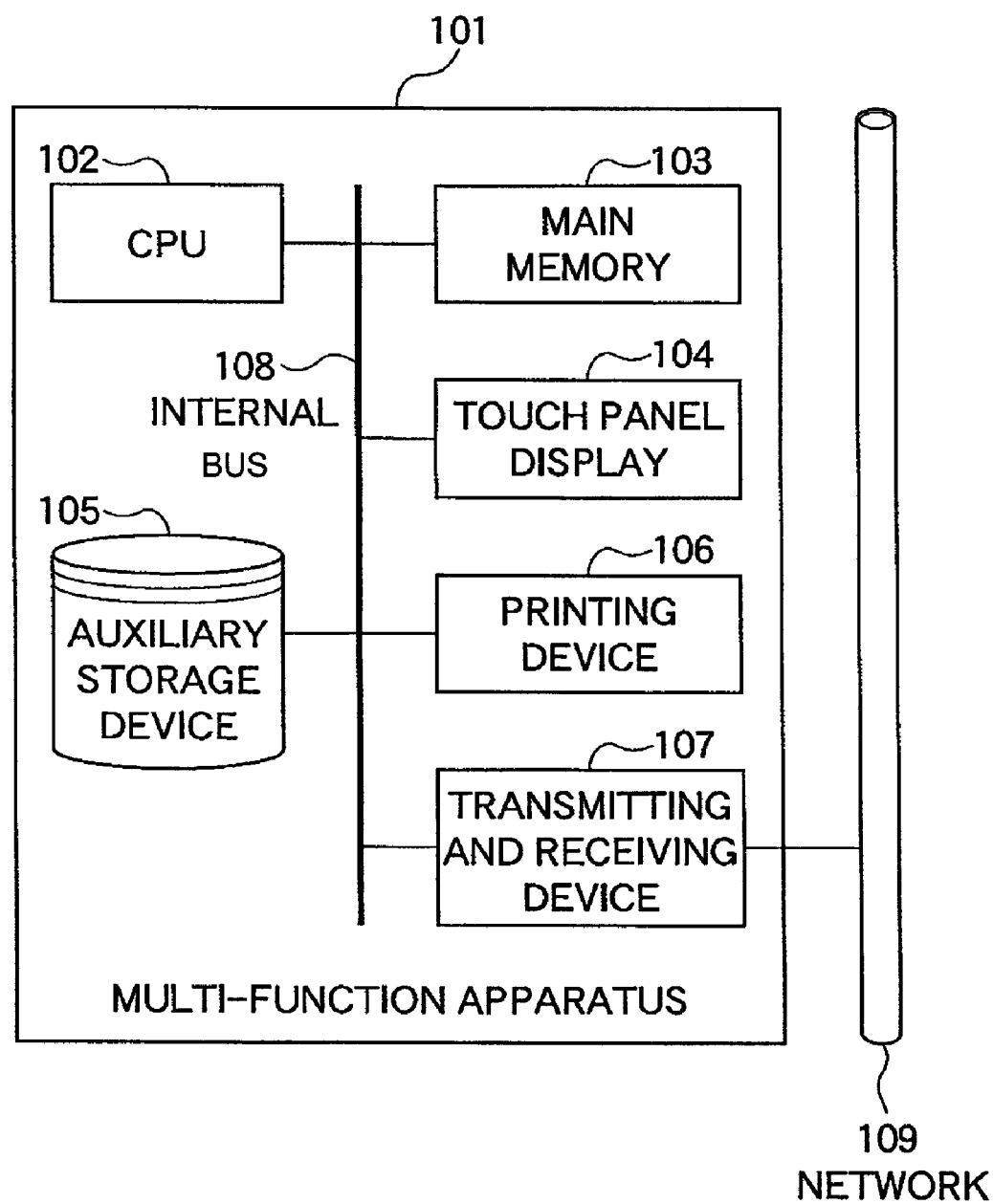
FIG. 1 is a block diagram showing the construction of an information apparatus constituting a part of an information processing system according to a first embodiment of the present invention.

FIG. 1 is a block diagram showing the construction of an information apparatus constituting a part of an information processing system according to a first embodiment of the present invention. It should be noted that in the present embodiment, the information processing system is implemented by an image forming system, and the information apparatus is implemented by a multi-function apparatus. The multi-function apparatus has a copy function, a printer function, a facsimile function, a transmitting and receiving function, and an electronic mail transmitting and receiving function.

The multi-function apparatus 101 is comprised of a CPU 102, a main memory 103, a touch panel display 104, an auxiliary storage device 105, a printing device 106, and a transmitting and receiving device 107. These component elements are connected to one another via an internal bus 108. The transmitting and transmitting device 107 is for carrying out communication with other information apparatus on a network 109 via the network 109.

The CPU 102 mainly carries out program execution.

The main memory 103 is comprised of a RAM, a ROM, and so on and used as a storage area for programs and data, a working area for operation of the CPU 102 during program execution, and a working area for operation of the multi-function apparatus 101 during various kinds of image processing.

The touch panel display 104 is comprised of a liquid crystal touch-sensitive panel and displays desired images as is the case with ordinary displays and makes inputs to the multi-function apparatus 101 in response to screen touching by a user.

In the present embodiment, a display section and an operating section are implemented by the touch panel display 104, but they may be separately constructed. Specifically, user interfaces typified by a mouse and a keyboard may be provided separately from an ordinary display.

The auxiliary storage device 105 is comprised of a mass storage device such as a hard disk drive or a RAM drive and stores a large amount of data and holds program execution codes. As compared with the main memory 103, the auxiliary storage device 105 stores data required to be stored for a longer period of time.

The printing device 106 prints images based on image data, document data, print data in PDL (Page Description Language), received facsimile data, and electronic mail data on sheet media using toners. It should be noted that the printing device 106 may be configured to use ink in place of toners.

The transmitting and receiving device 107 carries out transmission and reception of facsimile data, electronic mail data, and so on. The transmitting and receiving device 107 also receives print jobs and others from an external client PC (Personal Computer) 201 (see FIG. 2) and others to operate as a network printer.

The internal bus 108 is used to exchange various digital data between the component elements 102 to 107.

The network 109 connects the multi-function apparatus 101 to other information apparatus on the network 109 and enables communication between them. A description of a device that carries out communication will be given later.

Figure 2:
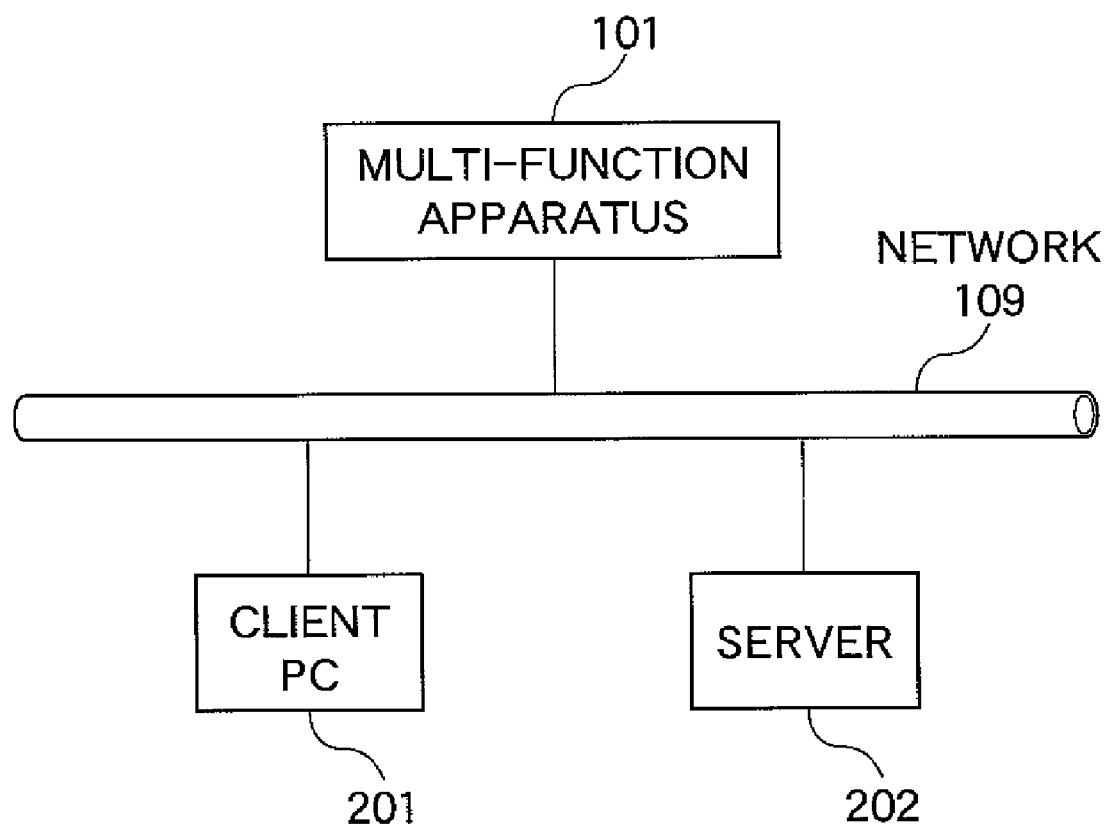
FIG. 2 is a block diagram showing the entire image forming system including a multi-function apparatus.

FIG. 2 is a block diagram showing the entire image forming system including the multi-function apparatus 101.

The image forming system is comprised of the multi-function apparatus 101, the client PC 201, and a server 202, which are connected to one another via the network 109. It should be noted that other information apparatus, not shown, other than the multi-function apparatus 101, client PC 201, and server 202 may be connected to the network 109.

Each of the client PC 201 and the server 202 is an information processing apparatus equipped with a CPU, a ROM, a RAM, input/output devices, and so on.

The client PC 201 creates macros to be executed on the multi-function apparatus 101. The client PC 201 also registers information on the created macros in the server 202. It should be noted that macros may be created by other information apparatus included in the image forming system. Also, macros may be created by the multi-function apparatus 101 or the server 202. For example, it may be configured such that a user operates the touch panel display 104 of the multi-function apparatus 101 to create macros and registers the created macros in the server 202. It may also be configured such that a user operates a user interface device of the server 202 to create macros and registers the created macros in the server 202.

Figure 3:
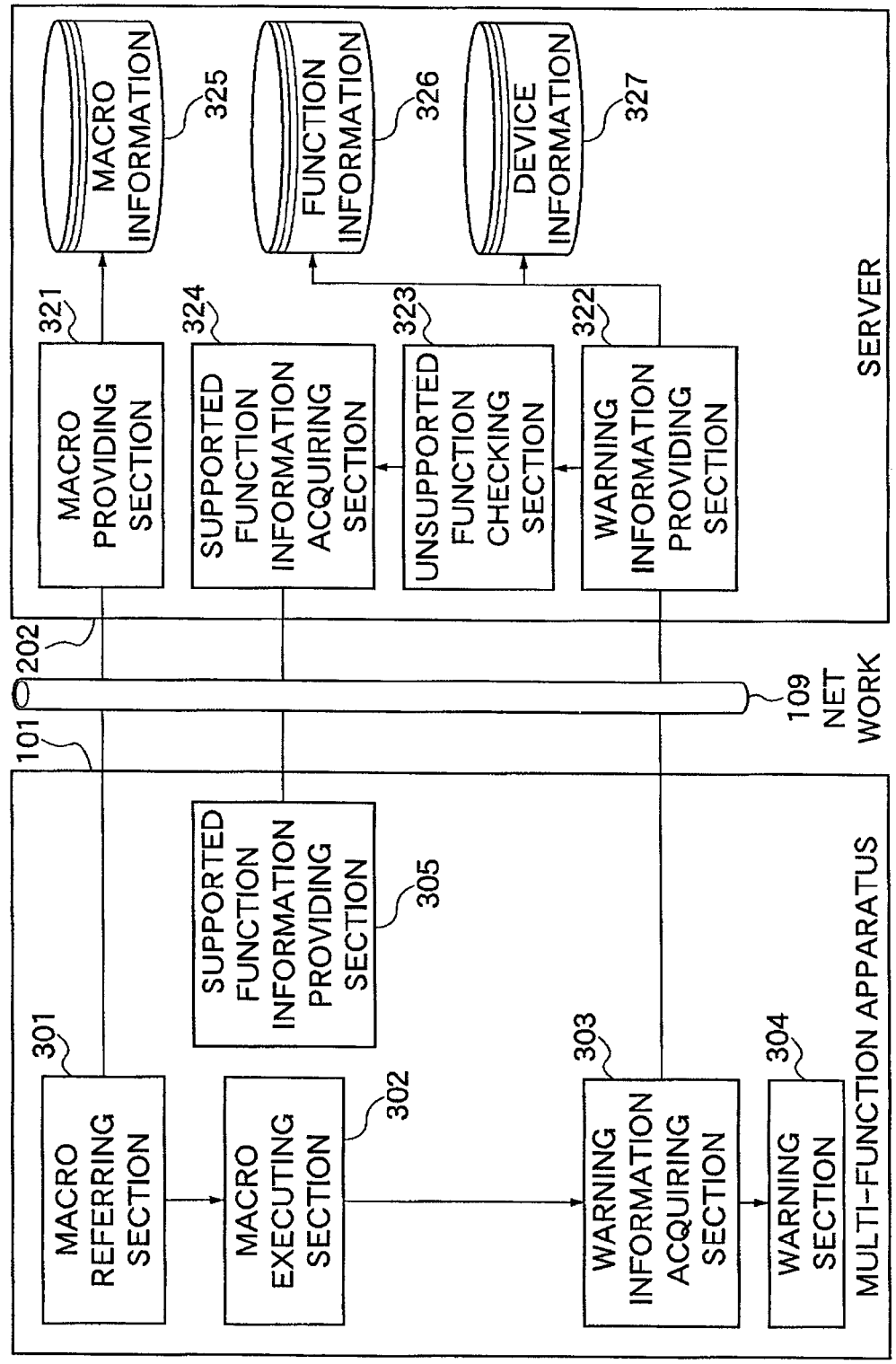
FIG. 3 is a block diagram showing functions realized by the CPU of the multi-function apparatus executing predetermined software and functions realized by the CPU of a server executing predetermined software.

FIG. 3 is a block diagram showing functions realized by the CPU 102 of the multi-function apparatus 101 executing predetermined software and functions realized by the CPU of the server 202 executing predetermined software.

First, a description will be given of the functions realized by the multi-function apparatus 101.

The multi-function apparatus 101 realizes functions of a macro referring section 301, a macro executing section 302, an associated supported function information providing section 305, a warning information acquiring section 303, and a warning section 304.

The macro referring section 301 has a function of communicating with the server 202 via the network 109 and referring to macro information held by the server 202. The macro referring section 301 is activated by the user via the touch panel display 104, and a list of a plurality of pieces of macro information acquired is displayed on the touch panel display 104.

The macro executing section 302 executes a function of executing a macro based on macro information selected by the user from among a plurality of pieces of macro information acquired by the macro referring section 301. When this macro is executed, functions unsupported by the multi-function apparatus 101 are ignored or replaced with other functions which are in turn executed in accordance with a user's intent designated in response to warning information acquired by the warning information acquiring section 303, described later.

When the macro executing section 302 executes a macro, the warning information acquiring section 303, described later, acquires warning information from the server 202, and the acquired warning information is notified to the user by the warning section 304, described later. It should be noted that although in the present embodiment, the warning information acquiring section 303 acquires warning information in timing immediately before macro execution, the warning information acquiring section 303 may acquire warning information in other timing. For example, the warning information acquiring section 303 may acquire warning information in timing in which the macro referring section 301 refers to a macro. In this case, however, a macro to be processed has to be identified in advance.

The supported function information providing section 305 has a function of communicating with the server 202 via the network 109 and providing the server 202 with information indicative of functions supported by the multi-function apparatus 101.

The warning information acquiring section 303 communicates with the server 202 via the network 109 and notifies the server 202 of a macro selected by the user as described above. The warning information acquiring section 303 inquires of the server 202 whether or not the multi-function apparatus 101 supports all the functions required to execute the selected macro. The warning information acquiring section 303 then acquires warning information indicative of the inquiry result from the server 202. The warning information is notified to the user by the warning section 304, described later. The warning information sent to the warning information acquiring section 303 by the server 202 will be described later in detail.

The warning section 304 has a function of notifying the user of warning information acquired from the server 202 by the warning information acquiring section 303. The warning section 304 notifies the user of warning information by displaying the same on the touch panel display 104.

Although in the present embodiment, the warning section 304 notifies the user of warning information by displaying the same on the touch panel display 104, warning information may be notified to the user via other media. For example, warning information may be notified to the user by sending an electronic mail to a registered user's address or by printing the warning information.

Next, a description will be given of the functions realized by the server 202.

The server 202 realizes functions of a macro providing section 321, a warning information providing section 322, an unsupported function checking section 323, and a supported function information acquiring section 324. The server 202 also holds macro information 325, function information 326, and device information 327 as data, The macro providing function 321 has a function of reading out the macro information 325 registered in the server 202 and providing the multi-function apparatus 101 with the macro information 325. The macro providing section 321 is activated by the macro referring section 301 of the multi-function apparatus 101.

The supported function information acquiring section 324 has a function of communicating with the multi-function apparatus 101 via the network 109 and acquiring information indicative of functions supported by the multi-function apparatus 101 from the supported function information providing section 305.

The unsupported function checking section 323 compares functions supported by the multi-function apparatus 101, which have been acquired by the supported function information acquiring section 324, with functions required to execute a macro to be processed, which has been selected by the user of the multi-function apparatus 101. The unsupported function checking section 323 then checks whether or not functions unsupported by the multi-function apparatus 101 exist in the functions required to execute the macro to be processed.

The warning information providing section 322 provides the multi-function apparatus 101 with warning information indicative of functions that cannot be supported by the multi-function apparatus 101 when a macro to be processed is going to be executed on the multi-function apparatus 101. Specifically, the warning information providing section 322 extracts a warning message associated with the unsupported functions detected by the unsupported function checking section 323 from the function information 326 and transmits the message as warning information to the multi-function apparatus 101. The warning information providing section 322 also retrieves information equipment supporting the unsupported functions unsupported by the multi-function apparatus 101 from the device information 327. The warning information providing section 322 then adds information identifying the detected information equipment to the warning information.

Here, information indicative of unsupported functions and information indicative of information equipment on the network 109 which support the unsupported functions are given as examples of warning information. Examples of information indicative of unsupported functions include the full names of the functions, how to deal with the functions in equipment that does not support the functions, the names and prices of products that support the unsupported functions or have the unsupported functions as options, and contact information for purchasing such products. Examples of information indicative of information equipment that supports unsupported functions include the identification names, model designations, and installation locations of the information equipment. It should be noted that information other than the information mentioned above may be additionally included in warning information.

The macro information 325 is comprised of a plurality of pieces of macro information registered by the client PC 201 or the like and stored on a macro-by-macro basis. The macro information 325 is indicative of the order in which a plurality of functions of information equipment such as the multi-function apparatus 101 are executed, the settings in accordance with which a plurality of functions of the information apparatus such as the multi-function apparatus 101 are executed. The data format of the macro information 325 may be a special-purpose data format or a structured data format, typified by XML (Extensible Markup Language). It should be noted that the macro information 325 may be registered from a console of the multi-function apparatus 101 or the server 202 other than the client PC 201.

The macro information 325 is expressed, for example, in XML (extensible Markup Language) as shown in FIG. 11. A macro in FIG. 11 is indicative of a process in which scanned originals are printed and transmitted. Functions registered in the macro are expressed as subelements of macro elements. The XML in FIG. 11 is indicative of the macro that executes a scanning function, a printing function, and a transmitting function in this order since it includes a scanning element, a printing element, and a transmitting element.

In the scanning process carried out by the macro in FIG. 11, both sides of each original are scanned and read at the same magnification. In the printing process, the number of copies is five, and double-sided printing and bookbinding are carried out. In the transmitting process, the copies are transmitted in encrypted PDF to an electronic mail address "a@com." Such detailed set values for the respective functions are described in XML as subelements of the respective function elements.

The function information 326 is function information that is registered in advance in a database of the server 202 by an administrator and detailed information that relates to functions supported by all the information equipment that can be connected to the network 109. Examples of the function information 326 include information indicative of the full names of functions, how to deal with the functions in models that do not support the functions (for example, the functions are ignored or replaced with other functions), and warning messages associated with the respective functions. Here, an administrator registers the function information 326, but the server 202 may communicate with information equipment connected thereto on the network 109 and collect the function information 326 from the information equipment.

The device information 327 includes information indicative of functions supported by all the information equipment (devices) that can be connected to the network 109 on a device-by-device basis.

Figure 4:
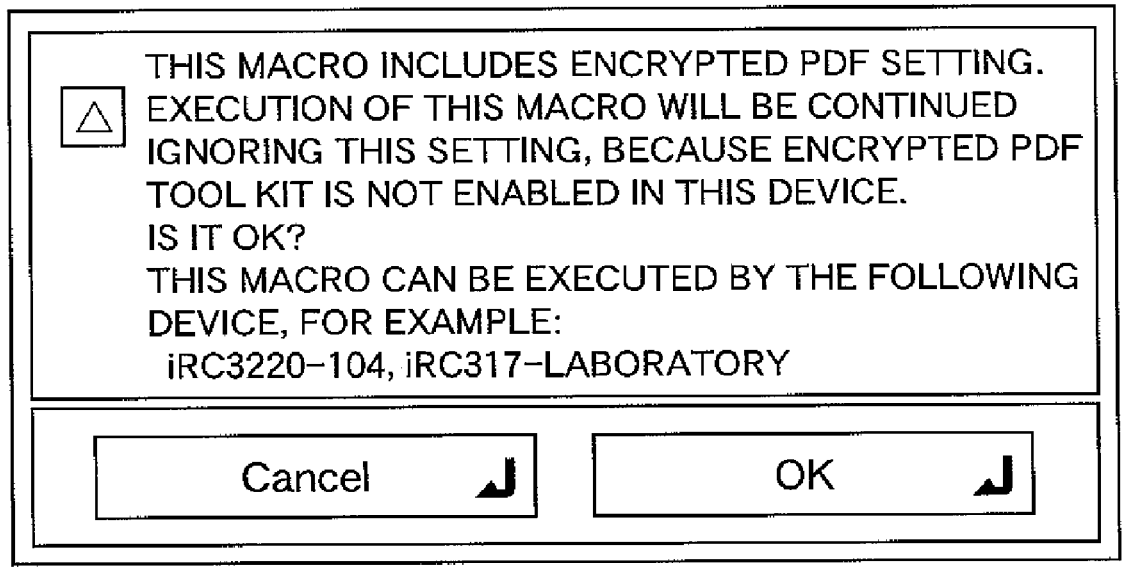
FIG. 4 is a view showing a warning screen displayed on a touch panel display by a warning section of the multi-function apparatus.

FIG. 4 is a view showing a warning screen displayed on the touch panel display 104 by the warning section 304 of the multi-function apparatus 101. Warning information as described above is displayed on the warning screen.

On the warning screen, first, a description is given of functions that are included in a macro of which execution has been instructed and not supported by the multi-function apparatus 101. Specifically, the full names of the functions, the conditions for using the functions, and how to deal with the functions are described. Next, the names of other information apparatuses that are connected to the network 109 and support the functions are listed.

A message on the warning screen illustrated in FIG. 4 indicates that the multi-function apparatus 101 does not have an encrypted PDF processing function. The message also inquires of the user whether or not a macro may be executed ignoring this function. The message also indicates that two information devices, "iRC3220-104" and "iRC3170-laboratory", which are connected to the multi-function apparatus 101 on the network 109, can execute all the functions included in the macro that is going to be executed.

Figure 5:
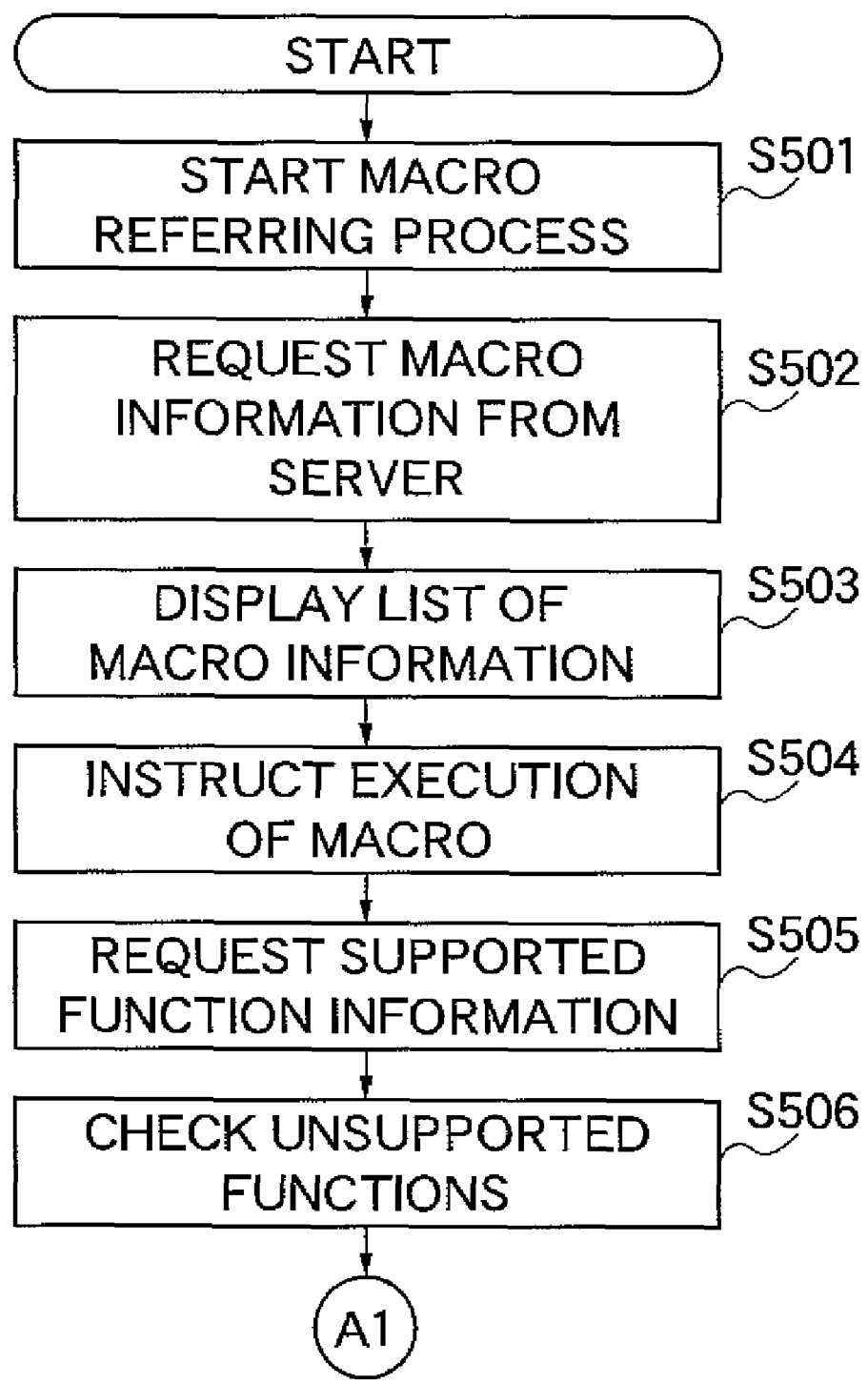
FIG. 5 is a flow chart (1/2) showing a procedure for carrying out a sequence of processes carried out by the multi-function apparatus and the server when the multi-function apparatus acquires macro information registered in the server and executes a macro.
Figure 6:
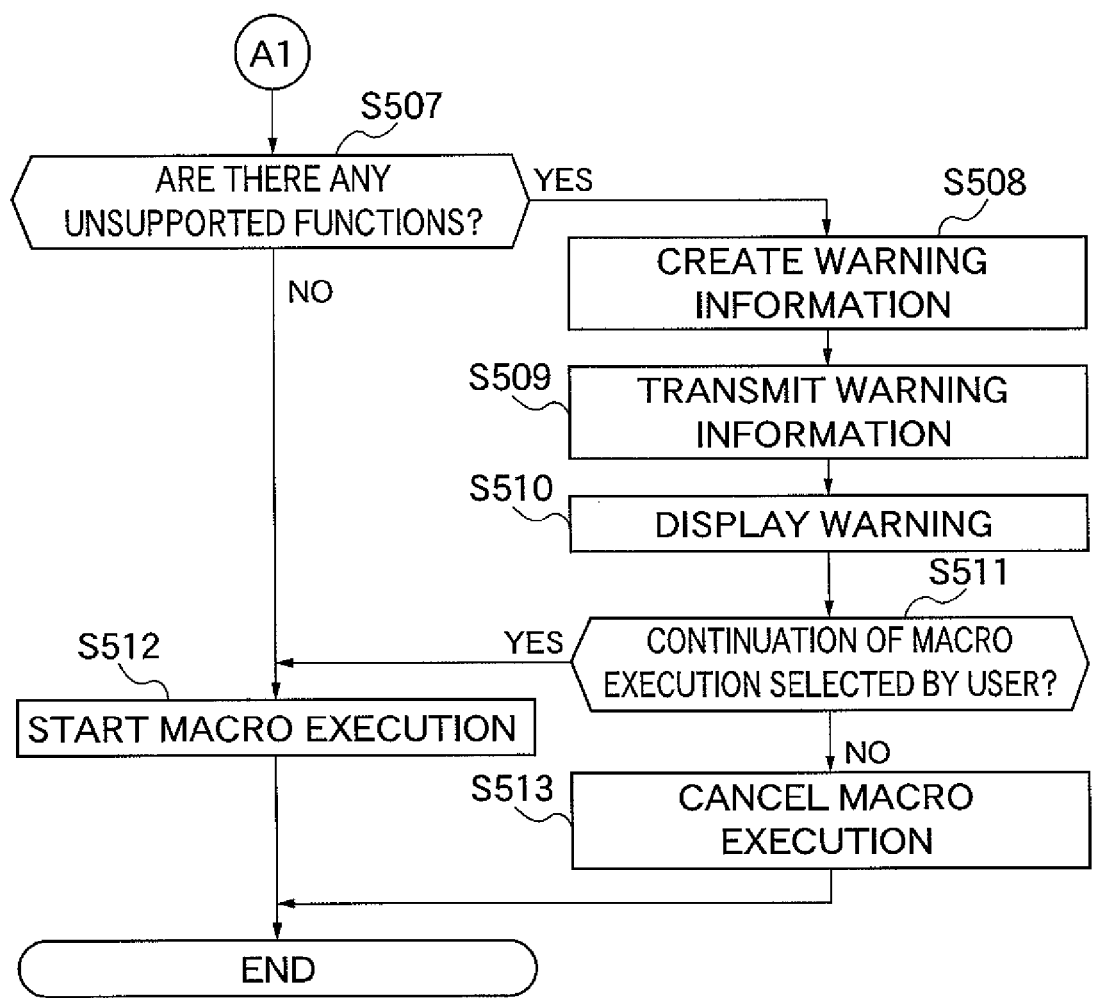
FIG. 6 is a flow chart (2/2) showing a procedure for carrying out a sequence of processes carried out by the multi-function apparatus and the server when the multi-function apparatus acquires macro information registered in the server and executes a macro.

FIGS. 5 and 6 are flow charts showing a procedure for carrying out a sequence of processes carried out by the multi-function apparatus 101 and the server 202 when the multi-function apparatus 101 acquires macro information registered in the server 202 and executes a macro.

In a step S501, the user inputs an instruction for referring to macro information registered in the server 202 via the touch panel display 104 of the multi-function apparatus 101. This initiates a macro referring process.

In a step S502, the macro referring section 301 of the multi-function apparatus 101 requests the server 202 to transmit macro information. In response to this, the macro providing section 321 of the server 202 reads out macro information 325 from the database and transmits the same to the macro referring section 301.

In a step S503, a list of a plurality of pieces of macro information transmitted from the server 202 in the step S502 is displayed on the touch panel display 104 of the multi-function apparatus 101.

In a step S504, the user selects desired macro information from among the plurality of pieces of macro information displayed listed in the step S503 and instructs execution of the selected macro. In response to this instruction, the macro executing section 302 starts executing the macro. In advance of the execution, the macro executing section 302 activates the warning information acquiring section 303, and the warning information acquiring section 303 notifies the server 202 of the selected macro information and requests the server 202 to provide warning information as described above. The transmission of warning information from the server 202 in response to this request is carried out in a step S509, described later.

In a step S505, the supported function information acquiring section 324 of the server 202 activates the supported function information providing section 305 of the multi-function apparatus 101, and the supported function information providing section 305 transmits functions supported by the multi-function apparatus 101 to the supported function information acquiring section 324 of the server 202.

In a step S506, the unsupported function checking section 323 of the server 202 detects an unsupported function that is not covered by the functions supported by the multi-function apparatus 101, which were acquired in the step S505, from among a plurality of functions required to execute the macro to be processed. Since the macro to be processed is described in XML as shown in FIG. 11, the functions required to execute the macro to be processed can be determined by referring to elements of XML expressing the macro.

In a step S507, if it is determined that an unsupported function was detected in the step S506, the process proceeds to a step S508, and if not, the process proceeds to a step S512.

In the step S508, the warning information providing section 322 of the server 202 extracts a warning message associated with the unsupported function detected by the unsupported function checking section 323 from the function information 326. Also, the warning information providing section 322 retrievers an information apparatus that supports the unsupported function unsupported by the multi-function apparatus 101 from among the other information apparatus on the network 109 from the device information 327. The warning information providing section 322 then adds information identifying the detected information apparatus to the extracted warning message.

In the step S509, the warning information providing section 322 transmits the warning message created in the step S508 to the warning information acquiring section 303 of the multifunction apparatus 101.

In a step S510, the warning information acquiring section 303 of the multi-function apparatus 101 receives the warning message, and the warning section 304 displays the warning message on the touch panel display 104. An example of the warning message displayed on the touch panel display 104 is illustrated in FIG. 4.

In a step S511, it is determined whether or not the user who had seen the warning message on the touch panel display 104 has selected continuation of the macro execution (i.e., whether or not the user has depressed an OK button appearing in FIG. 4). If the user has selected continuation of the macro execution, the process proceeds to a step S512, and if not (the user has depressed a Cancel button appearing in FIG. 4), the process proceeds to a step S513.

In the step S512, the macro executing section 302 of the multi-function apparatus 101 executes the macro to be processed. It should be noted that, in the case where the step S512 is executed after the execution of the step S511, the macro to be processed is executed ignoring the unsupported function included therein.

In the step S513, the macro executing section 302 of the multi-function apparatus 101 aborts the execution of the macro to be processed.

As described above, in the first embodiment, the multi-function apparatus 101 requests warning information from the server 202 holding a macro, and the server 202 detects functions unsupported by the multi-function apparatus 101 from among a plurality of functions included in the macro. The server 202 then transmits warning information relating to the detected functions to the multi-function apparatus 101, and the warning information is notified to the user of the multi-function apparatus 101. As a consequence, the user can give an instruction for executing the macro or aborting the execution of the macro in advance and obtain information about information equipment that supports all the functions included in the macro. Thus, the usability for users is improved.

In the first embodiment described above, the macro referring section 301 of the multi-function apparatus 101 acquires a plurality of macros from the server 202, and the user selects a desired macro from among the plurality of macros. In response to this, the warning information acquiring section 303 of the multi-function apparatus 101 notifies the server 202 of the selected macro to be processed and requests the server 202 to transmit warning information. In the server 202 having been notified of the macro to be processed, the unsupported function checking section 323 compares a plurality of functions required to execute the macro to be processed with functions supported by the multi-function apparatus 101, which have been acquired by the supported function information acquiring section 324, and detects functions unsupported by the multi-function apparatus 101. The warning information providing section 322 transmits warning information associated with the detected unsupported function to the multi-function apparatus 101.

An alternative arrangement may be adopted in place of the above arrangement. Specifically, the multi-function apparatus 101 designates a predetermined macro for the server 202 and therefore acquires macro information associated with the predetermined macro from the server 202. The server 202 then compares a plurality of functions required to execute the macro to be processed with functions supported by the multi-function apparatus 101, which have been acquired by the supported function information acquiring section 324, and detects functions unsupported by the multi-function apparatus 101. The warning information providing section 322 transmits warning information associated with the detected unsupported functions to the multi-function apparatus 101.

With this alternative arrangement, however, a macro to be processed has to be identified in advance by the multi-function apparatus 101.

Next, a description will be given of an information processing system according to a second embodiment of the present invention.

In the second embodiment, a plurality of multi-function apparatuses are connected to a network, and when a macro is executed, information on the macro is registered in the multi-function apparatus that has executed the macro. In the case where a first multi-function apparatus executes a macro by referring to macro information registered in a second multi-function apparatus, the first multi-function apparatus detects unsupported functions. It should be noted that the multi-function apparatuses mentioned above may be implemented by information equipment.

Figure 7:
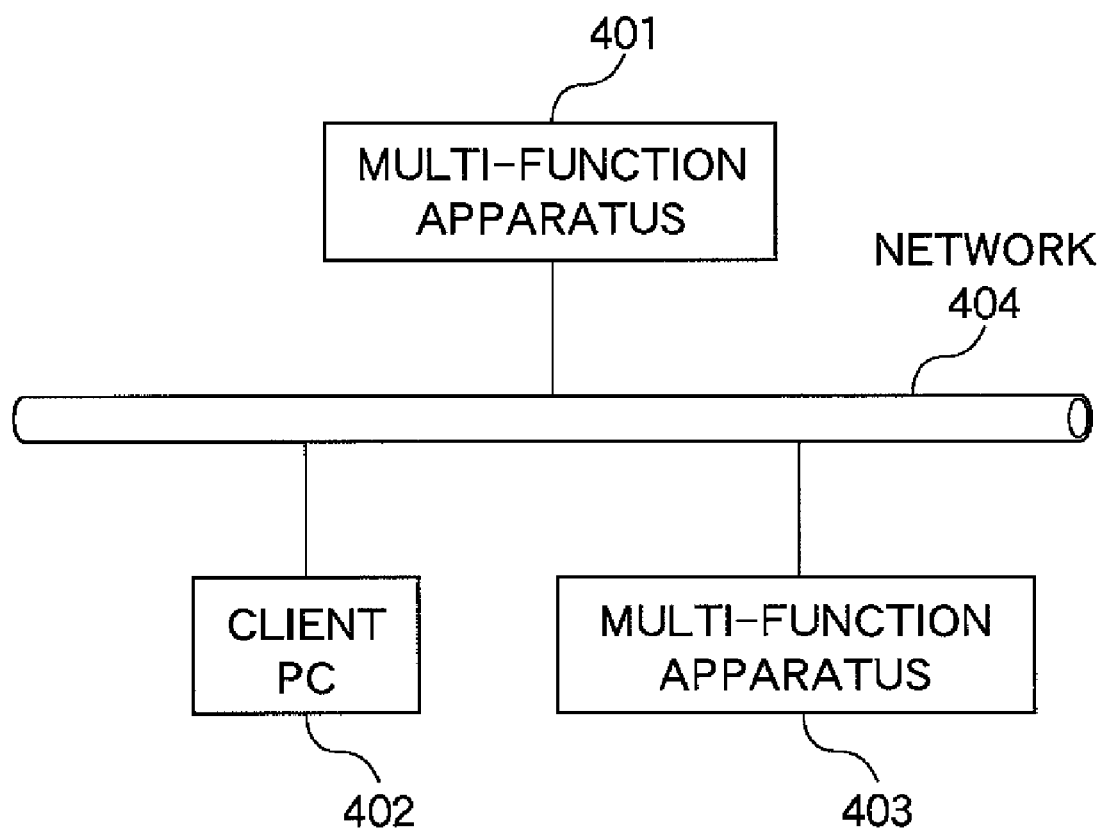
FIG. 7 is a block diagram showing the construction of an image forming system according to a second embodiment of the present invention.

FIG. 7 is a block diagram showing the construction of an image forming system (information processing system) according to the second embodiment.

This image forming system is comprised of multi-function apparatuses 401 and 403 and a client PC (Personal Computer) 402, which are connected to one another via a network 404. Although not illustrated, information equipment other than the multi-function apparatuses 401 and 403 and the client PC 402 may be connected to the network 404.

Each of the multi-function apparatuses 401 and 403 is identical in construction with the multi-function apparatus 101 according to the first embodiment illustrated in FIG. 1. The client PC 201 creates macros to be executed on the multi-function apparatuses 401 and 403. It should be noted that macros may be created by the multi-function apparatuses 401 and 403 and other information apparatus included in the image forming system.

In the following description, it is assumed that the multi-function apparatus 401 executes a macro with reference to macro information registered in the multi-function apparatus 403.

Figure 8:
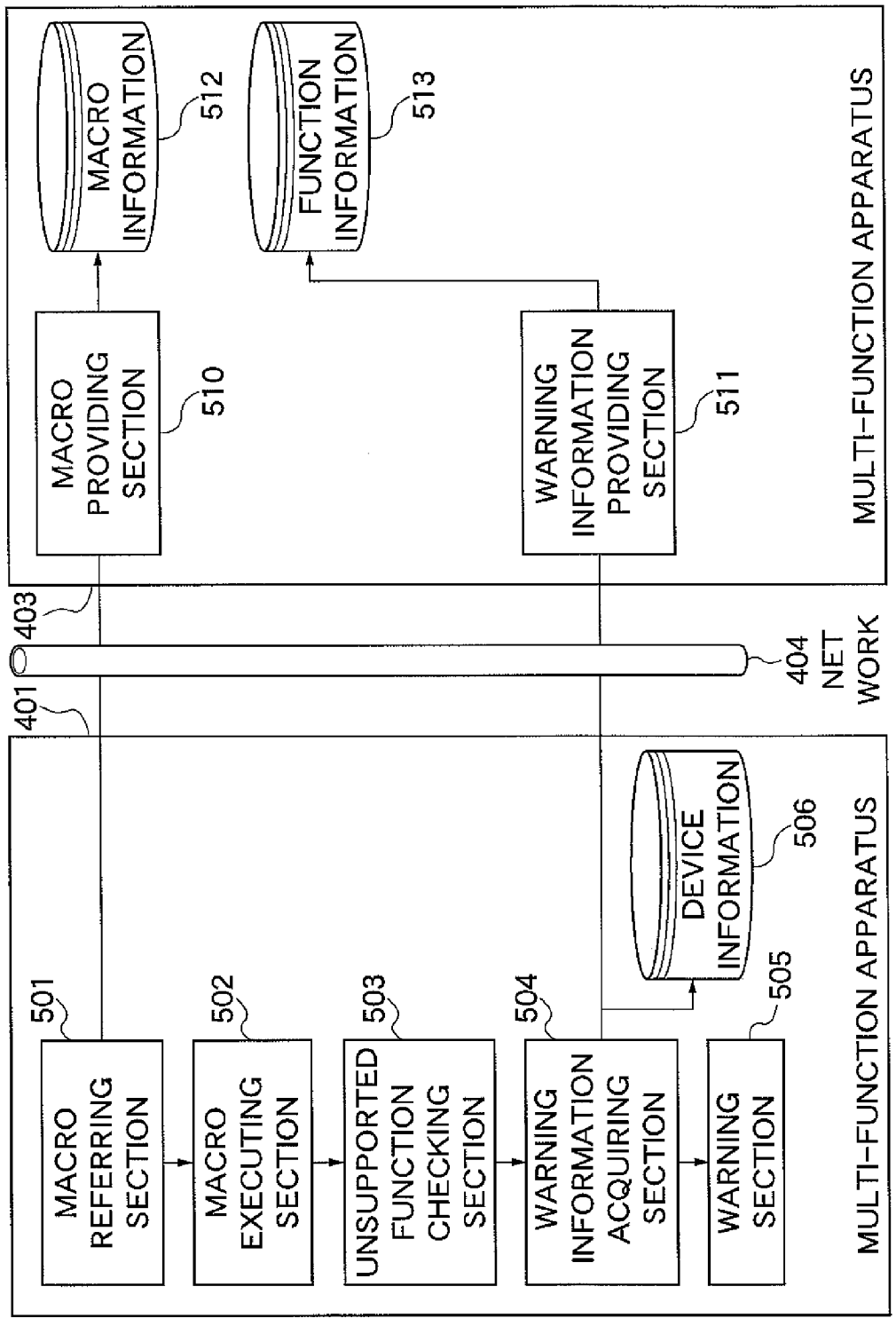
FIG. 8 is a block diagram showing functions realized by the CPU of a first multi-function apparatus executing predetermined software and functions realized by the CPU of a second multi-function apparatus executing predetermined software.

FIG. 8 is a block diagram showing functions realized by the CPU of the multi-function apparatus 401 executing predetermined software and functions realized by the CPU of the multi-function apparatus 403 executing predetermined software.

First, a description will be given of the functions realized by the multi-function apparatus 401.

The multi-function apparatus 401 realizes functions of a macro referring section 501, a macro executing section 502, an unsupported function checking section 503, a warning information acquiring section 504, and a warning section 505. The multi-function apparatus 401 also holds device information 506 as data.

As is the case with the macro referring section 301 according to the first embodiment, the macro referring section 501 has a function of communicating with the multi-function apparatus 403 via the network 404 and referring to macro information held by the multi-function apparatus 403.

As is the case with the macro executing section 302 according to the first embodiment, the macro executing section 502 has a function of executing a macro based on macro information selected by the user from among a plurality of pieces of macro information acquired by the macro referring section 501.

The unsupported function checking section 503 compares functions supported by the multi-function apparatus 401 with functions required to execute a macro to be processed, which has been selected by the user. The unsupported function checking section 503 then checks whether or not functions unsupported by the multi-function apparatus 401 exist in the functions required to execute the macro to be processed.

The warning information acquiring section 504 communicates with the multi-function apparatus 403 via the network 404 and acquires warning information associated with unsupported functions from the multi-function apparatus 403. Further, the warning information acquiring section 504 retrieves an apparatus equipment that supports the unsupported functions unsupported by the multi-function apparatus 401 from among information apparatuses the other the multi-function apparatuses 401 and 403 on the network 404 from the device information 506, described later. The warning information acquiring section 504 then adds information that identifies the detected information apparatus to the warning information.

The warning section 505 has a function of notifying the user of warning information created by the warning information acquiring section 504.

In the device information 506, information indicative of functions supported by all the information equipment (devices) that can be connected to the network 404 is provided on a device-by-device basis.

Next, a description will be given of the functions realized by the multi-function apparatus 403.

The multi-function apparatus 403 realizes functions of a macro providing section 510 and a warning information providing section 511. The multi-function apparatus 403 also holds macro information 512 and function information 513 as data.

As is the case with the macro providing section 321 according to the first embodiment, the macro providing function 510 has a function of reading out macro information 512 registered in a database of the multi-function apparatus 403 and providing the multi-function apparatus 401 with the macro information 512.

The warning information providing section 511 provides the multi-function apparatus 401 with warning information indicative of functions that cannot be supported by the multi-function apparatus 401 when a macro provided to the multifunction apparatus 401 by the macro providing section 510 is going to be executed on the multi-function apparatus 401. Specifically, the warning information providing section 511 extracts a warning message associated with the unsupported functions from the function information 513 and transmits the message as warning information to the multi-function apparatus 401.

The macro information 512 is comprised of a plurality of pieces of macro information registered by the client PC 402 or the like is stored in a database on a macro-by-macro basis. The macro information 512 is indicative of the order in which a plurality of functions of information equipment such as the multi-function apparatus 401 are executed and the settings in accordance with which a plurality of functions of information equipment such as the multi-function apparatus 401 are executed.

The function information 513 is function information that is registered in advance in a database of the multi-function apparatus 403 by an administrator and detailed information that relates to functions supported by all the information equipment that can be connected to the network 404. The function information 513 includes information indicative of the full names of functions, how to deal with the functions in models that do not support the functions (for example, the functions are ignored or replaced with other functions), and warning messages associated with the respective functions.

A warning information screen displayed on the touch panel display of the multi-function apparatus 401 is the same as the warning information screen according to the first embodiment illustrated in FIG. 4.

Although in the example illustrated in FIG. 8, the multi-function apparatus 401 has the function of executing macros, and the multi-function apparatus 403 has the function of providing macros, each of the multi-function apparatuses 401 and 402 may have both of these functions.

Figure 9:
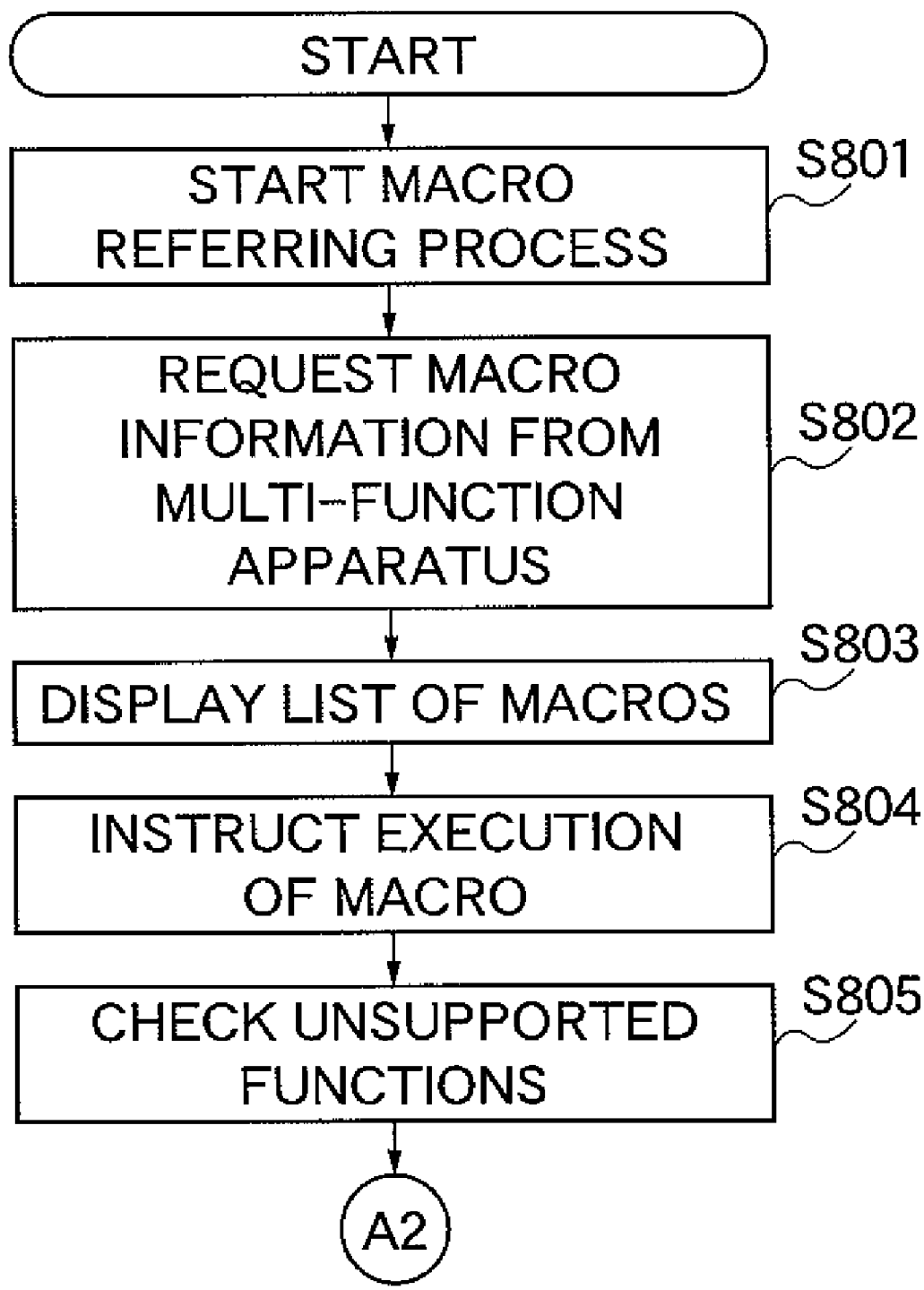
FIG. 9 is a flow chart (1/2) showing a procedure for carrying out a sequence of processes carried out by the first multi-function apparatus and the second multi-function apparatus when the first multi-function apparatus acquires macro information registered in the second multi-function apparatus and executes a macro.
Figure 10:
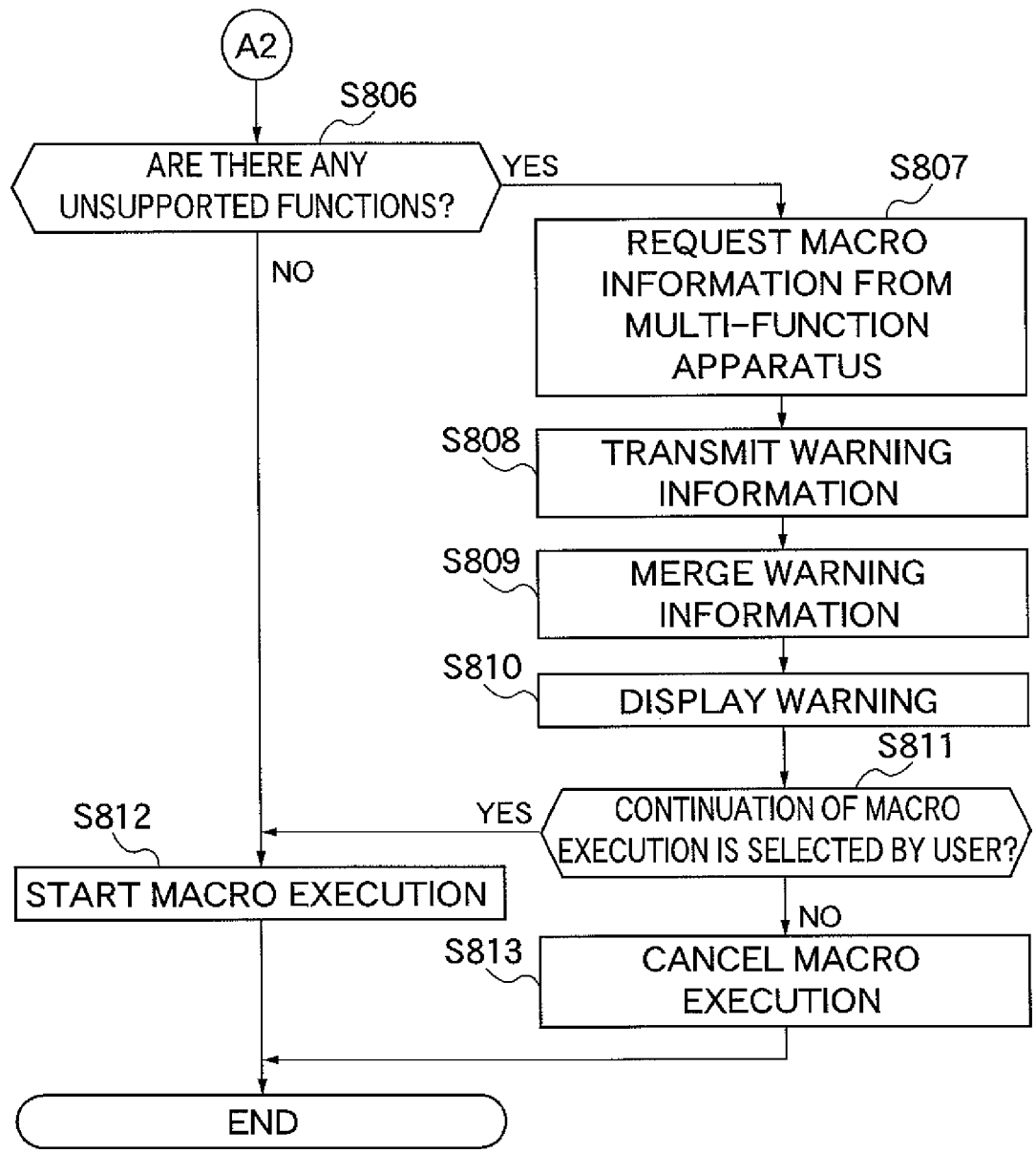
FIG. 10 is a flow chart (2/2) showing a procedure for carrying out a sequence of processes carried out by the first multi-function apparatus and the second multi-function apparatus when the first multi-function apparatus acquires macro information registered in the second multi-function apparatus and executes a macro.

FIGS. 9 and 10 are flow charts showing a procedure for carrying out a sequence of processes by the multi-function apparatuses 401 and 403 when the multi-function apparatus 401 acquires macro information registered in the multi-function apparatus 403 and executes a macro.

In a step S801, the user inputs an instruction for referring to macro information registered in the multi-function apparatus 403 via the touch panel display of the multi-function apparatus 401. This initiates a macro referring process.

In a step S802, the macro referring section 501 of the multi-function apparatus 501 requests the multi-function apparatus 403 to transmit macro information. In response to this, the macro providing section 510 of the multi-function apparatus 403 reads out macro information 512 from the database and transmits the same to the macro referring section 501.

In a step S803, a list of a plurality of pieces of macro information transmitted from the multi-function apparatus 403 in the step S802 is displayed on the touch panel display of the multi-function apparatus 401.

In a step S804, the user selects desired macro information from among the plurality of pieces of macro information listed in the step S803 and instructs execution of the selected macro. In response to this instruction, the macro executing section 502 starts executing the macro. In advance of the execution, the macro executing section 502 activates the warning information acquiring section 504 and requests the multi-function apparatus 403 to provide warning information. The transmission of warning information from the multi-function apparatus 403 in response to this request is carried out in a step S808, described later.

In a step S805, the unsupported function checking section 503 of the multi-function apparatus 401 detects an unsupported function that are not covered by the functions supported by the multi-function apparatus 401 from among a plurality of functions required to execute the macro to be processed, which has been selected by the user.

In a step S806, if it is determined that an unsupported function was detected in the step S805, the process proceeds to a step S807, and if not, the process proceeds to a step S812.

In the step S807, the warning information providing section 511 of the multi-function apparatus 403 extracts a warning message associated with the unsupported function detected by the unsupported function checking section 503 from the function information 513.

In the step S808, the warning information providing section 511 transmits the warning message extracted in the step S807 to the warning information acquiring section 504 of the multi-function apparatus 401.

In a step S809, the warning information acquiring section 504 of the multi-function apparatus 401 receives the warning message. The warning information acquiring section 504 then retrieves an information apparatus that supports the unsupported functions unsupported by the multi-function apparatus 401 from among the other information apparatuses on the network 404 from the device information 506. The warning information acquiring section 504 then adds information identifying the detected information apparatus to the received warning message.

In a step S810, the warning section 505 displays the warning message acquired in the step S809 on the touch panel display of the multi-function apparatus 401.

In a step S811, it is determined whether or not the user who had seen the warning message on the touch panel display has selected continuation of the macro execution (i.e., whether or not the user has depressed the OK button appearing in FIG. 4). If the user has selected continuation of the macro execution, the process proceeds to a step S912, and if not (the user has depressed the Cancel button appearing in FIG. 4), the process proceeds to a step S813.

In the step S812, the macro executing section 502 of the multi-function apparatus 401 executes the macro to be processed. Specifically, based on the macro described in XML as shown in FIG. 11, functions described in XML are executed in accordance with settings described in XML and in the order described in XML. It should be noted that, in the case where the step S812 is executed after the execution of the step S811, the macro to be processed is executed ignoring the unsupported function included therein.

In the step S813, the macro executing section 502 of the multi-function apparatus 401 aborts the execution of the macro to be processed.

As described above, in the second embodiment, the multi-function apparatus 401 acquires macro information from the multi-function apparatus 403 holding macros, and the multi-function apparatus 401 detects functions unsupported by the multi-function apparatus 401 from among a plurality of functions included in a designated macro. The multi-function apparatus 401 then requests the multi-function apparatus 403 to provide warning information associated with the detected functions, and the multi-function apparatus 403 transmits warning information relating to the detected functions to the multi-function apparatus 401. The multi-function apparatus 401 adds information about an information apparatus supporting the detected functions to the received warning information and notifies the user of the information. As a consequence, the user can give an instruction for executing the macro or aborting the execution of the macro in advance and obtain information on the information apparatus that supports all the functions included in the macro. Thus, usability for users is improved.

In the second described above, the macro referring section 501 of the multi-function apparatus 401 acquires a plurality of macros from the multi-function apparatus 403, and the user selects a desired macro from among the plurality of macros. The unsupported function checking section 503 of the multi-function apparatus 401 then compares functions required to execute the selected macro with functions supported by the multi-function apparatus 401 and detects functions unsupported by the multi-function apparatus 401.

An alternative arrangement may be adopted in place of the above arrangement. Specifically, the multi-function apparatus 401 designates a predetermined macro for the multi-function apparatus 403 and therefore acquires macro information associated with the predetermined macro from the multi-function apparatus 403. The unsupported function checking section 503 of the multi-function apparatus 401 then compares a plurality of functions required to execute the predetermined macro with functions supported by the multi-function apparatus 401 and detects functions unsupported by the multi-function apparatus 401.

With this alternative arrangement, however, a macro to be processed has to be identified in advance by the multi-function apparatus 401.

Further, in the second embodiment described above, when warning information is displayed, only information indicative of multi-function apparatuses that support all the functions included in a macro is displayed. Thus, the user who intends to cause any of the displayed multi-function apparatuses to execute the macro has to call the macro through operation of the multi-function apparatus.

Accordingly, when warning information is displayed, the user is prompted to select a multi-function apparatus that is to execute a macro, and in response to this, the macro is transmitted from the multi-function apparatus 403 to the selected multi-function apparatus. Thus, without the need to move from one multi-function apparatus to the other multi-function apparatus, the user can cause the other multi-function apparatus to execute a macro.

Further, it may be configured such that a macro is automatically acquired at the time of login in conjunction with login by a user to a multi-function apparatus.

Next, a description will be given of a third embodiment of the present invention.

In the third embodiment, in the case where unsupported functions have been detected in the second embodiment, the second-best macro can be automatically created and executed in accordance with functions of a first multi-function apparatus. This multi-function apparatus may be implemented by an information apparatus.

Figure 13:
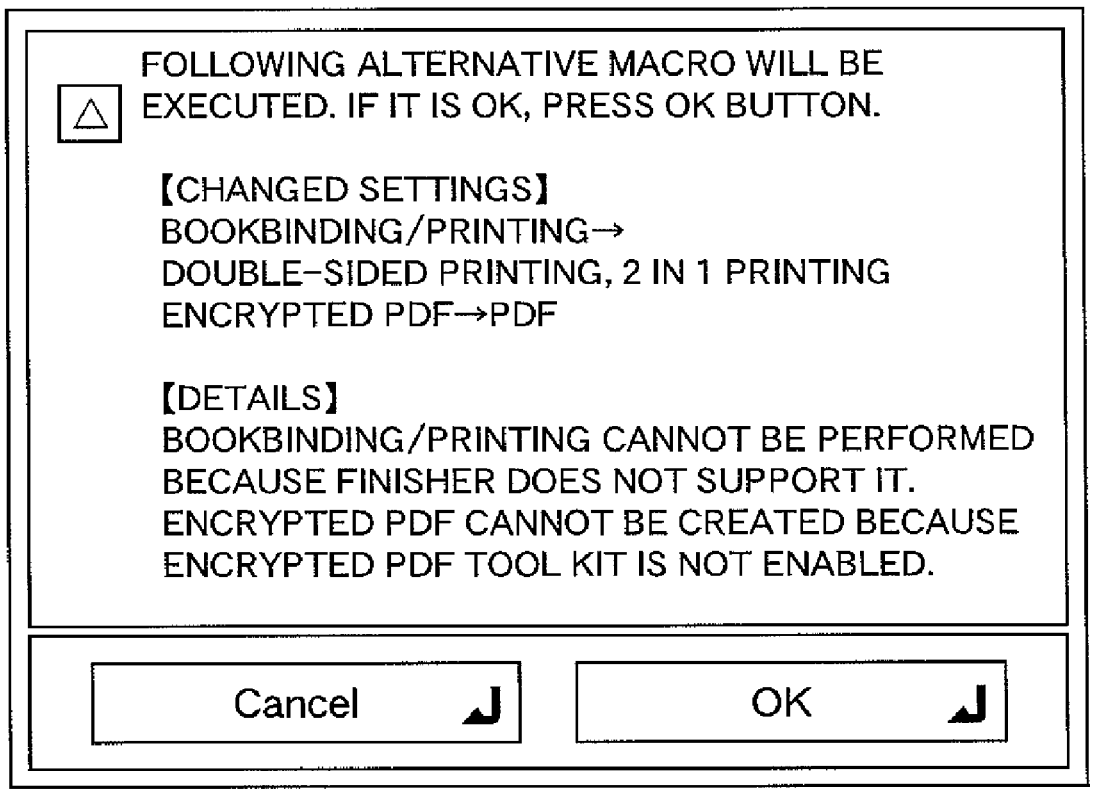
FIG. 13 is a view showing a warning screen displayed on a touch panel display by a warning section of the multi-function apparatus.

FIG. 12 is a block diagram showing functions realized by a CPU 102 of a multi-function apparatus 101 executing predetermined software and functions realized by the CPU of a server 202 executing predetermined software in an information processing system according to the third embodiment. In the block diagram of FIG. 12, the same elements as those appearing in the block diagram of FIG. 13 are designated by the same reference numerals, and description thereof is omitted.

First, a description will be given of the functions realized by the multi-function apparatus 101.

The multi-function apparatus 101 realizes functions of a macro referring section 301, a macro executing section 302, an supported function information providing section 305, a warning information acquiring section 303, a warning section 1201, and an alternative macro acquiring section 1202.

Since the macro referring section 301, the macro executing section 302, the supported function information providing section 305, and the warning information acquiring section 303 have been described in the above description of the first embodiment, and therefore description thereof is omitted.

The warning section 1201 notifies the user of warning information acquired from the server 202 by the warning information acquiring section 303. Also, the warning section 1201 acquires functions that are to replace functions that cannot be executed by equipment of the multi-function apparatus 101 from the alternative macro acquiring section 1202 and presents the functions to the user. Further, the warning section 1202 prompts the user as to whether to execute an alternative macro, continue macro execution ignoring unexecutable functions, or abort macro execution and carries out processing in accordance with the user's determination. The warning section 1202 notifies the user of the warning information by displaying the same on the touch panel display 104.

Although in the present embodiment, the warning section 1201 notifies the user of warning information by displaying the warning information on the touch panel display 104, warning information may be notified to the user through other media. For example, warning information may be notified to the user by sending an electronic mail to a registered user's address or by printing the warning information.

The alternative macro acquiring section 1202 communicates with the server 202 via the network 109 and notifies the server 202 of a macro selected by the user. The alternative macro acquiring section 1202 then acquires an alternative macro executable by the multi-function apparatus 101 from the server 202. The alternative macro is presented to the user by the warning section 1201.

Next, a description will be given of the functions realized by the server 202.

The server 202 includes a macro providing section 321, a warning information providing section 322, an unsupported function checking section 323, a supported function information acquiring section 324, and an alternative macro creating section 1221. The server 202 also holds macro information 325, function information 326, and device information 327 as data.

The macro providing section 321, the warning information providing section 322, the unsupported function checking section 323, and the supported function information acquiring section 324 have been described in detail in the above description of the first embodiment, and therefore description thereof is omitted.

The alternative macro creating section 1221 has a function of communicating the multi-function apparatus 101 via the network 109 and corrects a macro provided by the multi-function apparatus 101 to create an alternative macro so that the macro can be executed by the multi-function apparatus 101. An alternative macro is created by referring to a macro provided by the multi-function apparatus 101 and the device information 327 and assigning other similar functions to functions that cannot be used by the multi-function apparatus 101. Information about which function is to replace a certain function is acquired from the function information 326.

FIG. 14 is a view showing an example of an alternative macro created by the alternative macro creating section 1221 when the multi-function apparatus 101 executes a macro illustrated in FIG. 11. The macro in FIG. 11 describes designations relating to a bookbinding and printing function. Since the multi-function apparatus 101 does not have the bookbinding and printing function, however, a function of performing double-sided printing and 2 in 1 printing is designated as an alternative function (function which the multi-function apparatus 101 has). Also, although in the macro in FIG. 11, encrypted PDF is designated as the file format, the multi-function apparatus 101 does not have an encrypted PDF processing. Thus, as an alternative to this function, a function of transmitting data in normal PDF is designated. An alternative macro is a macro in which functions that cannot be executed by a multi-function apparatus trying to execute a macro from among functions described in this macro are replaced with functions executable by the multi-function apparatus as described.

FIG. 13 is a view showing a warning screen displayed on the touch panel display 104 by the warning section 1201 of the multifunction apparatus 101. On the warning screen, warning information described above and the contents of an alternative macro are displayed.

The warning screen displays a message that explains what functions are to replace unsupported functions that are included in a macro of which instruction has been instructed and are not supported by the multi-function apparatus 101. Specifically, function names of unsupported functions and function names of alternative functions are displayed for contrast. Further, a message that explains conditions for using the unsupported functions is displayed as detailed information.

The warning screen illustrated in FIG. 13 provides notification that the multi-function apparatus 101 does not have the bookbinding/printing function. As an alternative to this function, a function of performing double-sided printing and 2 in 1 printing is presented to the user. The warning screen also provides notification that the multi-function apparatus 101 does not have the encrypted PDF processing function. As an alternative to this function, a function of transmitting data in normal PDF is presented to the user. The warning screen prompts the user as to whether to use the macro in which settings have been changed as above as an alternative macro and continue the execution of the alternative macro. If the user depresses an OK button, the alternative macro is executed. If the user depresses a Cancel button, the execution of the alternative macro is aborted. Here, if the user depresses the OK button, the alternative macro may be registered as macro information 325 in the server 202, so that the alternative macro can be reused with ease.

As described above, in the third embodiment, the multi-function apparatus 101 requests warning information from the server 202 holding a macro, and the server 202 detects functions unsupported by the multi-function apparatus 101 from among a plurality of functions included in the macro. The server 202 then transmits warning information relating to the detected functions to the multi-function apparatus 101, and the multi-function apparatus 101 further requests the server 202 to create an alternative macro. The server 202 creates an alternative macro based on device information and function information and transmits the created alternative macro to the multi-function apparatus 101. The multi-function apparatus 101 notifies the user of the warning information and the alternative macro. Based on the warning information and the alternative macro, the user can give an instruction for executing the macro or aborting the execution of the macro execution in advance and also can execute a macro with functions as similar as possible. Thus, the usability for users is improved.

Although in the present embodiment, information about which function is to replace a certain function is acquired from the function information 326, other means may be adopted. For example, an alternative function may be acquired from another database registered by an administrator. Alternatively, an alternative function may be defined within a macro in advance.

Also, although in the present embodiment, one alternative function replaces a certain function, a plurality of functions may replace a certain function. In such a case, the warning screen is equipped with an interface for prompting the user to select a plurality of alternative macros as alternatives.

Also, although in the present embodiment, an alternative function is automatically generated, there may be a case where a function that is not originally desired by an administrator is enabled. To cope with this, by referring to authority information on a user-by-user basis, only functions permitted by users in advance are incorporated into alternative macros and presented to the users.

Also, when an alternative macro is executed, the alternative macro is registered as a job waiting for an administrator's permission, and the job is retained until the administrator gives a permission.

Although in the above described embodiments, a multi-function apparatus acquires macro information from an information apparatus holding a macro and executes the macro, another information apparatus other than the multi-function apparatus may acquire macro information and execute a macro.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium in which the program code is stored constitute the present invention.

Examples of the storage medium for supplying the program code include a floppy (registered trademark) disk, a hard disk, a magneto-optical disk, optical disks such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of any of the above described embodiments may be accomplished not only by executing a program code read out by a computer, but also by causing an OS (Operating System) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, it is to be understood that the functions of any of the above described embodiments may be accomplished not only by executing the program code read out from a computer, but also by causing an OS or the like operating on the computer to perform a part or all of the actual operations based on instructions of the program code.

In this case, the program code is supplied from a storage medium in which the program code is stored, or is supplied by downloading directly from another computer, a database, or the like, not shown, connected to the Internet, a commercial network, a local area network, or the like.

Although in the above described embodiments, the printing process carried out by the multi-function apparatus is the electrophotographic process, the present invention is not limited to this, but the present invention may be applied to various printing processes such as inkjet printing, thermal transfer printing, thermal printing, electrostatic printing, and discharge breakdown printing.

The form of the above program code may be an object code, a program executed by an interpreter, script data supplied to an OS (Operating System), or the like.

The above described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Applications Nos. 2006-046851 filed on Feb. 23, 2006 and 2007-028277 filed on Feb. 7, 2007, which are hereby incorporate by reference herein in its entirety.

What is claimed is:

1. An information processing system in which a first information apparatus and a second information apparatus holding at least one macro indicative of a procedure for executing at least one function are connected to each other via a network, comprising:
   a macro acquiring unit that is provided in the first information apparatus and that acquires a macro held by the second information apparatus;
   an unsupported function detecting unit that is provided in the second information apparatus and that detects functions that are not supported by the first information apparatus from among functions included in the macro;
   a warning information transmitting unit that is provided in the second information apparatus and that creates warning information relating to the functions detected by said unsupported function detecting unit and transmits the warning information to the first information apparatus;
   a notifying unit that is provided in the first information apparatus and that notifies a user of the warning information transmitted by said warning information transmitting unit; and
   an alternative macro creating unit that is provided in the second information apparatus and creates an alternative macro by replacing the functions detected by said unsupported function detecting unit with alternative functions supported by the first information apparatus,
   wherein said warning information transmitting unit further transmits information on the alternative macro to the first information apparatus,
   wherein said notifying unit further notifies the user of information on the alternative macro transmitted from said warning information transmitting unit,
   wherein the warning information includes information that prompts the user to give an instruction regarding execution of the macro, and
   wherein the first information apparatus further comprises macro execution control unit that provides control to execute the macro or cancel execution of the macro in accordance with an intent of the user who has responded to the warning information.

2. The information processing system according to claim 1, wherein said warning information transmitting unit adds information relating to an information apparatus that supports the functions detected by said unsupported function detecting unit from among a plurality of information apparatuses connected to the network and transmits the information to the first information apparatus.

3. The information processing system according to claim 1, wherein the first information apparatus further comprises a function notifying unit that notifies the second information apparatus of functions that are supported by the first information apparatus, and
   wherein said unsupported function detecting unit that regards the functions notified from said function notifying unit as functions that are supported by the first information apparatus.

4. The information processing system according to claim 1, wherein said alternative macro creating unit creates a plurality of alternative macros, and
   wherein said notifying unit notifies the user of information on the plurality of alternative macros and a message that prompts the user to select an alternative macro.

5. An information apparatus that holds at least one macro indicative of a procedure for executing at least one function and is connected to another information apparatus via a network, comprising:
   a macro information providing unit that provides the other information apparatus with a macro designated by the other information apparatus;
   an unsupported function detecting unit that detects functions that are not supported by the other information apparatus from among functions included in the designated macro;
   a warning information transmitting unit that creates warning information on the functions detected by said unsupported function detecting unit and transmits the warning information to the other information apparatus; and
   an alternative macro creating unit that creates an alternative macro by replacing the functions detected by said unsupported function detecting unit with alternative functions supported by the other information apparatus,
   wherein said warning information transmitting unit further transmits information on the alternative macro to the other information apparatus,
   wherein the warning information includes information that prompts the user to give an instruction regarding execution of the macro, and
   wherein the other information apparatus further comprises macro execution control unit that provides control to execute the macro or cancel execution of the macro in accordance with an intent of the user who has responded to the warning information.

6. An information processing system in which a first information apparatus and a second information apparatus holding at least one macro indicative of a procedure for executing at least one function are connected to each other via a network, comprising:
   a macro acquiring unit that is provided in the first information apparatus and that acquires a macro held by the second information apparatus;
   an unsupported function detecting unit that is provided in the first information apparatus and that detects functions that are not supported by the first information apparatus from among functions included in the macro;
   a warning information transmitting unit that is provided in the second information apparatus and that creates warning information relating to the functions detected by said unsupported function detecting unit and transmits the warning information to the first information apparatus;

a notifying unit provided in the first information apparatus and that notifies a user of the warning information transmitted by said warning information transmitting unit; and an alternative macro creating unit that is provided in the second information apparatus and creates an alternative macro by replacing the functions detected by said unsupported function detecting unit with alternative functions supported by the first information apparatus, wherein said warning information transmitting unit further transmits information on the alternative macro to the first information apparatus, wherein said notifying unit further notifies the user of information on the alternative macro transmitted from said warning information transmitting unit, wherein the warning information includes information that prompts the user to give an instruction regarding execution of the macro, and wherein the first information apparatus further comprises macro execution control unit that provides control to execute the macro or cancel execution of the macro in accordance with an intent of the user who has responded to the warning information.

7. The information processing system according to claim 6, wherein said notifying unit adds information relating to an information apparatus that supports the functions detected by said unsupported function detecting unit from among a plurality of information apparatuses connected to the network and notifies the information to the user.

8. The information processing system according to claim 6, wherein the warning information includes information that prompts the user to give an instruction regarding execution of the macro, and wherein the first information apparatus further comprises macro execution control unit that provides control to execute the macro or cancel execution of the macro in accordance with an intent of the user who has responded to the warning information.

9. An information apparatus that is connected to another information apparatus holding at least one macro indicative of a procedure for executing at least one function via a network, comprising:

a macro acquiring unit that acquires a macro held by the other information apparatus;

an unsupported function detecting unit that detects functions that are not supported by the information apparatus from among functions included in the macro;

a notifying unit that receives warning information relating to the functions, detected in said unsupported function detecting unit, from the other information apparatus and notifies a user of the warning information, wherein said macro acquiring unit further acquires an alternative macro from the other information apparatus, wherein the alternative macro replaces the functions detected by said unsupported function detecting unit with alternative functions supported by the information apparatus, wherein said notifying unit further receives information on the alternative macro from the other information apparatus, wherein said notifying unit further notifies the user of the information on the alternative macro received from the other information apparatus, wherein the warning information includes information that prompts the user to give an instruction regarding execution of the macro, and wherein the information apparatus further comprises macro execution control unit that provides control to execute the macro or cancel execution of the macro in accordance with an intent of the user who has responded to the warning information.

10. A macro executing method applied to an information processing system in which a first information apparatus and a second information apparatus holding at least one macro indicative of a procedure for executing at least one function are connected to each other via a network, comprising:

a macro acquiring step in which the first information apparatus acquires a macro held by the second information apparatus;

an unsupported function detecting step in which the second information apparatus detects functions that are not supported by the first information apparatus from among functions included in the macro;

a warning information transmitting step in which the second information apparatus creates warning information relating to the functions detected in said unsupported function detecting step and transmits the warning information to the first information apparatus;

a notifying step in which the first information apparatus notifies a user of the warning information transmitted in said warning information transmitting step; and an alternative macro creating step in which the second information apparatus creates an alternative macro by replacing the functions detected by said unsupported function detecting step with alternative functions supported by the first information apparatus, wherein said warning information transmitting step further transmits information on the alternative macro to the first information apparatus, wherein said notifying step further notifies the user of information on the alternative macro transmitted by said warning information transmitting step, wherein the warning information includes information that prompts the user to give an instruction regarding execution of the macro, and a macro execution control step in which the first information apparatus executes the macro or cancels execution of the macro in accordance with an intent of the user who has responded to the warning information.

11. A macro executing method applied to an information apparatus that holds at least one macro indicative of a procedure for executing at least one function and is connected to another information apparatus via a network, comprising:

a macro providing step of providing the other information apparatus with a macro designated by the other information apparatus;

an unsupported function detecting step of detecting functions that are not supported by the other information apparatus from among functions included in the designated macro; a warning information transmitting step of creating warning information on the functions detected in said unsupported function detecting step and transmitting the warning information to the other information apparatus; and an alternative macro creating step of creating an alternative macro by replacing the functions detected by said unsupported function detecting step with alternative functions supported by the other information apparatus, wherein said warning information transmitting step further transmits information on the alternative macro to the other information apparatus, wherein the warning information includes information that prompts the user to give an instruction regarding execution of the macro, and a macro execution control step in which the other information apparatus executes the macro or cancels execution of the macro in accordance with an intent of the user who has responded to the warning information.

12. A macro executing method applied to an information processing system in which a first information apparatus and a second information apparatus holding at least one macro indicative of a procedure for executing at least one function are connected to each other via a network, comprising:

a macro acquiring step in which the first information apparatus acquires a macro held by the second information apparatus;

an unsupported function detecting step in which the first information apparatus detects functions that are not supported by the first information apparatus from among functions included in the macro;

a warning information transmitting step in which the second information apparatus creates warning information relating to the functions detected in said unsupported function detecting step and transmits the warning information to the first information apparatus;

a notifying step in which the first information apparatus notifies a user of the warning information transmitted in said warning information transmitting step; and an alternative macro creating step in which the second information apparatus creates an alternative macro by replacing the functions detected by said unsupported function detecting step with alternative functions supported by the first information apparatus, wherein said warning information transmitting step further transmits information on the alternative macro to the first information apparatus, wherein said notifying step further notifies the user of information on the alternative macro transmitted from said warning information transmitting step, wherein the warning information includes information that prompts the user to give an instruction regarding execution of the macro, and a macro execution control step in which the first information apparatus executes the macro or cancels execution of the macro in accordance with an intent of the user who has responded to the warning information.

13. A macro executing method applied to an information apparatus that is connected to another information apparatus holding at least one macro indicative of a procedure for executing at least one function via a network, comprising:

a macro acquiring step of acquiring a macro held by the other information apparatus;

an unsupported function detecting step of detecting functions that are not supported by the information apparatus from among functions included in the macro;

a notifying step of receiving warning information relating to the functions, detected in said unsupported function detecting step, from the other information apparatus and notifying a user of the warning information;

an alternative macro acquiring step of acquiring an alternative macro from the other information apparatus, wherein the alternative macro replaces the functions detected by said unsupported function detecting step with alternative functions supported by the information apparatus;

an information receiving step of receiving information on the alternative macro from the other information apparatus, and an alternative macro notifying step of notifying the user of the information on the alternative macro received from the other information apparatus, wherein the warning information includes information that prompts the user to give an instruction regarding execution of the macro, and a macro execution control step in which the information apparatus executes the macro or cancels execution of the macro in accordance with an intent of the user who has responded to the warning information.

14. A storage medium storing a program for causing an information apparatus to execute a macro executing method applied to the information apparatus that holds at least one macro indicative of a procedure for executing at least one macro indicative of a procedure of executing at least one function and connected to another information apparatus via a network, said method comprising:

a macro providing step of providing the other information apparatus with a macro designated by the other information apparatus;

an unsupported function detecting step of detecting functions that are not supported by the other information apparatus from among functions included in the designated macro; and a warning information transmitting step of creating warning information on the functions detected in said unsupported function detecting step and transmitting the warning information to the other information apparatus; and an alternative macro creating step of creating an alternative macro by replacing the functions detected by said unsupported function detecting step with alternative functions supported by the other information apparatus, wherein said warning information transmitting step further transmits information on the alternative macro to the other information apparatus, wherein the warning information includes information that prompts the user to give an instruction regarding execution of the macro, and a macro execution control step in which the other information apparatus executes the macro or cancels execution of the macro in accordance with an intent of the user who has responded to the warning information.

15. A storage medium storing a program for causing an information apparatus to execute a macro executing method applied to the information apparatus that is connected to another information apparatus holding at least one macro indicative of a procedure for executing at least one function via a network, said method comprising:

a macro acquiring step of acquiring a macro held by the other information apparatus;

an unsupported function detecting step of detecting functions that are not supported by the information apparatus from among functions included in the macro;

a notifying step of receiving warning information relating to the functions, detected in said unsupported function detecting step, from the other information apparatus and notifying a user of the warning information; and an alternative macro acquiring step of acquiring an alternative macro from the other information apparatus, wherein the alternative macro replaces the functions detected by said unsupported function detecting step with alternative functions supported by the information apparatus;

an information receiving step of receiving information on the alternative macro from the other information apparatus, and an alternative macro notifying step of notifying the user of the information on the alternative macro received from the other information apparatus, wherein the warning information includes information that prompts the user to give an instruction regarding execution of the macro, and a macro execution control step in which the information apparatus executes the macro or cancels execution of the macro in accordance with an intent of the user who has responded to the warning information.

* * * * *